(12) United States Patent
Wiechers et al.

(10) Patent No.: US 7,068,399 B2
(45) Date of Patent: Jun. 27, 2006

(54) SYSTEMS FOR CONVERTING HARDCOPY TO DIGITAL DATA

(75) Inventors: Alejandro Wiechers, Jalisco (MX); Gustavo M. Guillemin, Jalisco (MX)

(73) Assignee: Hewlett-Packard Development Company, L.P., Houston, TX (US)

( * ) Notice: Subject to any disclaimer, the term of this patent is extended or adjusted under 35 U.S.C. 154(b) by 952 days.

(21) Appl. No.: 09/816,818

(22) Filed: Mar. 22, 2001

(65) Prior Publication Data

US 2002/0135818 A1  Sep. 26, 2002

(51) Int. Cl.
*H04N 1/04*  (2006.01)

(52) U.S. Cl. ...................... 358/474; 358/473; 358/450; 358/483

(58) Field of Classification Search ................ 358/408, 358/444, 404, 450, 483, 473, 496, 443; 382/278; 455/556.1, 352, 418; 379/100.02, 100.09
See application file for complete search history.

(56) References Cited

U.S. PATENT DOCUMENTS

| | | | | |
|---|---|---|---|---|
| 4,233,636 A | * | 11/1980 | Harbaugh et al. | 358/480 |
| 4,656,343 A | * | 4/1987 | Gerritsen et al. | 235/454 |
| 5,298,937 A | | 3/1994 | Telle | |
| 6,122,684 A | * | 9/2000 | Sakura | 710/73 |

FOREIGN PATENT DOCUMENTS

| | | |
|---|---|---|
| EP | 902588 | 3/1999 |
| WO | WO 94/30001 | * 12/1994 |

* cited by examiner

*Primary Examiner*—Edward Coles
*Assistant Examiner*—Heather D. Gibbs

(57) ABSTRACT

Document processing systems are provided that are capable of facilitating scanning of one or more documents via multiple scanners. In this regard, a preferred document processing system includes a document assembly system. The document assembly system is configured to electrically communicate with a first scanner, which may be assigned to a first group of scanners, and a second scanner, which may be assigned to a second group of scanners. The scanners provide scan information to the document assembly system. The document assembly system is configured to correlate the scan information received from the first scanner with the scan information received from the second scanner. Computer readable media and methods also are provided.

20 Claims, 4 Drawing Sheets

SYSTEMS FOR CONVERTING HARDCOPY TO DIGITAL DATA

BACKGROUND OF THE INVENTION

1. Field of the Invention

The present invention generally relates to document processing and, in particular, to systems and methods for scanning documents (hardcopy).

2. Description of the Related Art

As is known, document processing devices, such as scanners, for example, are utilized for converting printed information, i.e., information printed on hardcopy, to an electronic, e.g., digital, format. By way of example, when a multi-page document is to be scanned, the pages of the document are individually scanned by the scanner. Oftentimes, the scanning process may include the use of an automatic document feeder (ADF) which enables the scanner to automatically draw a page from a stack of pages of the document. Each page is then provided to an appropriate portion of the scanner, e.g., the bed, for scanning.

When multiple documents are to be scanned, typically, each document (and its associated set of multiple pages) is scanned separately. More specifically, a document is scanned and then removed from the scanner prior to scanning the next document. This scanning process is utilized so that scan information corresponding to a scanned document does not become improperly associated with scan information of another scanned document. Utilization of such a scanning process, however, tends to reduce scanning efficiency as the scanner is intermittently utilized.

Therefore, there is a need for improved systems and methods that address these and other shortcomings of the prior art.

SUMMARY OF THE INVENTION

Briefly described, the present invention relates to document processing. In this regard, a preferred embodiment may be construed as providing a document processing system that includes a document assembly system. The document assembly system is configured to electrically communicate with a first scanner, which may be assigned to a first group of scanners, and a second scanner, which may be assigned to a second group of scanners. The scanners provide scan information, e.g., digital information corresponding to the document(s) that have been scanned, to the document assembly system. The document assembly system is configured to correlate the scan information received from the first scanner with the scan information received from the second scanner. Preferably, correlation of the scan information provided by the various scanners enables the scan information to be readily attributed to a document(s) or a portion thereof. For example, in some embodiments, scan information associated with a particular document may be stored in a first e-file, whereas scan information associated with another document(s) may be stored in another e-file(s).

Some embodiments of the invention may be construed as providing methods for facilitating document processing. In this regard, a preferred embodiment includes the steps of: (1) receiving scan information from a first scanner; (2) receiving scan information from a second scanner; and (3) correlating the scan information. In some embodiments, the aforementioned functionality may be provided facilitated by computer readable media.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF A PREFERRED EMBODIMENT

Figure 1:
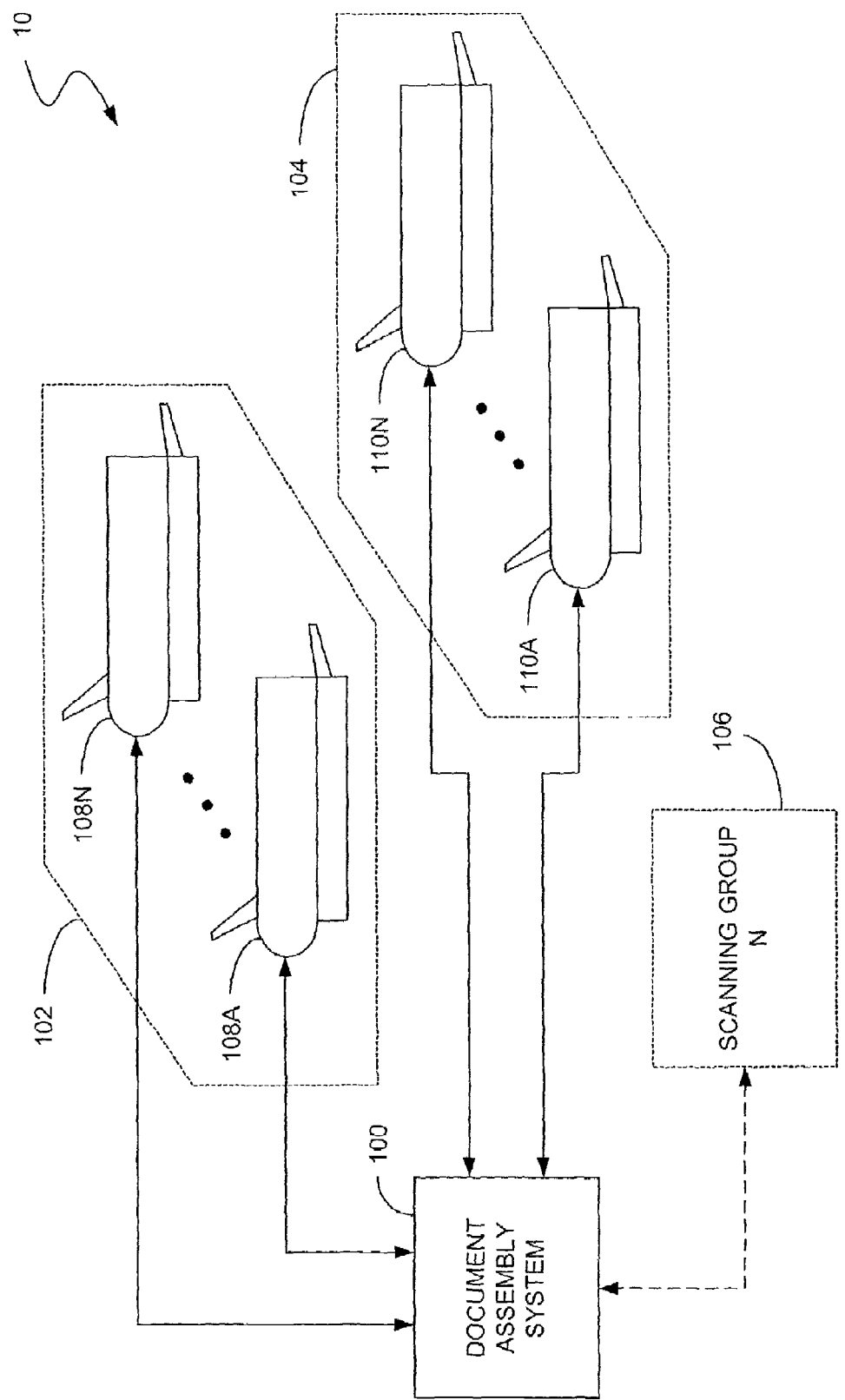
FIG. 1 is a schematic diagram depicting a preferred embodiment of the document processing system of the present invention.

Reference will now be made in detail to the description of the invention as illustrated in the drawings with like numerals indicating corresponding parts throughout the several views. As shown in FIG. 1, a preferred embodiment of the document processing system 10 of the present invention includes a document assembly system 100. As will be described in greater detail hereinafter, document assembly system 100 preferably enables collection, correlation, and/or storage of digital information corresponding to documents scanned by one or more scanners. By way of example, document assembly system 100 may communicate with one or more groups of scanners, such as a first group 102 of scanners and a second group 104 of scanners. Additional groups of scanners, e.g., scanning group 106, may be provided.

As shown in the representative embodiment of FIG. 1, each of the aforementioned groups of scanners may include one or more scanners. More specifically, group 102 includes scanners 108A, . . . , through 108N, and group 104 includes scanners 110A, . . . , through 110N. As utilized herein, the term "scanner" refers to a device that is capable of converting information embodied on a document, e.g., printed information, and converting that information into a digital format.

Each of the scanners of the document processing system 10 communicate, e.g., electrically communicate, with document assembly system 100 so as to be able to provide information corresponding to scanned documents to the document assembly system. For instance, during a scanning operation, each scanner may provide digital information corresponding to documents scanned by that scanner to the document assembly system. In some embodiments, such information may be processed, such as by optical character recognition (OCR) software, for example, prior to being received by the document assembly system, while, in other embodiments, OCR processing may be accomplished after receipt by the document assembly system.

Document assembly systems of the present invention may be implemented in hardware, software, firmware, or a combination thereof. In a preferred embodiment, however, the document assembly system is implemented as a software package, which can be adaptable to run on different platforms and operating systems, in combination with a set of hardware and shall be described further herein. More specifically, a preferred embodiment of the document assembly system, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

In the context of this document, a "computer-readable medium" can be any means that can contain, store, communicate, propagate or transport the program for use by or in connection with the instruction execution system, apparatus, or device. The computer readable medium can be, for example, but is not limited to, an electronic, magnetic, optical, electromagnetic, infrared, or semi-conductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable, programmable, read-only memory (EPROM or Flash memory) (magnetic), an optical fiber (optical), and a portable compact disk read-only memory (CDROM) (optical). Note that the computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 2:
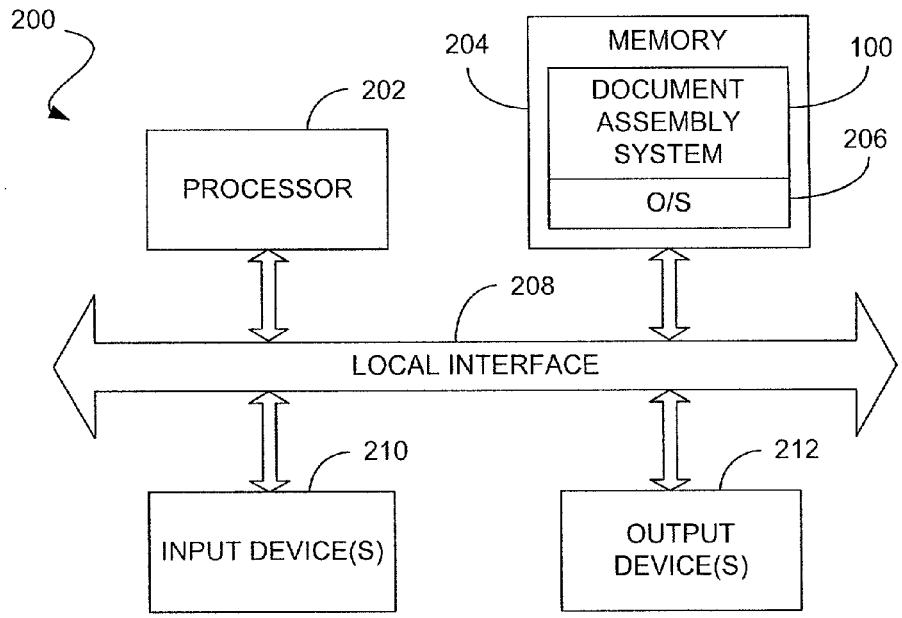
FIG. 2 is a schematic diagram depicting a computer or processor-based system that may be utilized in implementing the document processing system of FIG. 1.

FIG. 2 illustrates a computer or processor-based system 200 which may facilitate document assembly system 100 of the present invention. As shown in FIG. 2, a computer system 200 generally comprises a processor 202 and a memory 204 with an operating system 206. Herein, the memory 204 may be any combination of volatile and nonvolatile memory elements, such as random access memory or read only memory. The processor 202 accepts instructions and data from memory 204 over a local interface 208, such as a bus(es). The system also includes an input device(s) 210 and an output device(s) 212. Examples of input devices may include, but are not limited to, a serial port, a scanner, or a local access network connection. Examples of output devices may include, but are not limited to, a video display, a Universal Serial Bus, a printer port or a local access network connection. Generally, this system may run any of a number of different platforms and operating systems, including, but not limited to, HP-ux™, Linux™, Unix™, Sun Solaris™ or Windows NT™ operating systems. The document assembly system of the present invention, the functions of which shall be described hereinafter, resides in memory 204 and is executed by the processor 202. It should be noted that one or more processor-based systems, such as the processor-based system depicted in FIG. 2, for example, may be utilized to facilitate the functionality described hereinafter, with the one or more processor-based systems being communicatively coupled, e.g., in a network environment, so that the systems may cooperate to provide the various functions.

Figure 3:
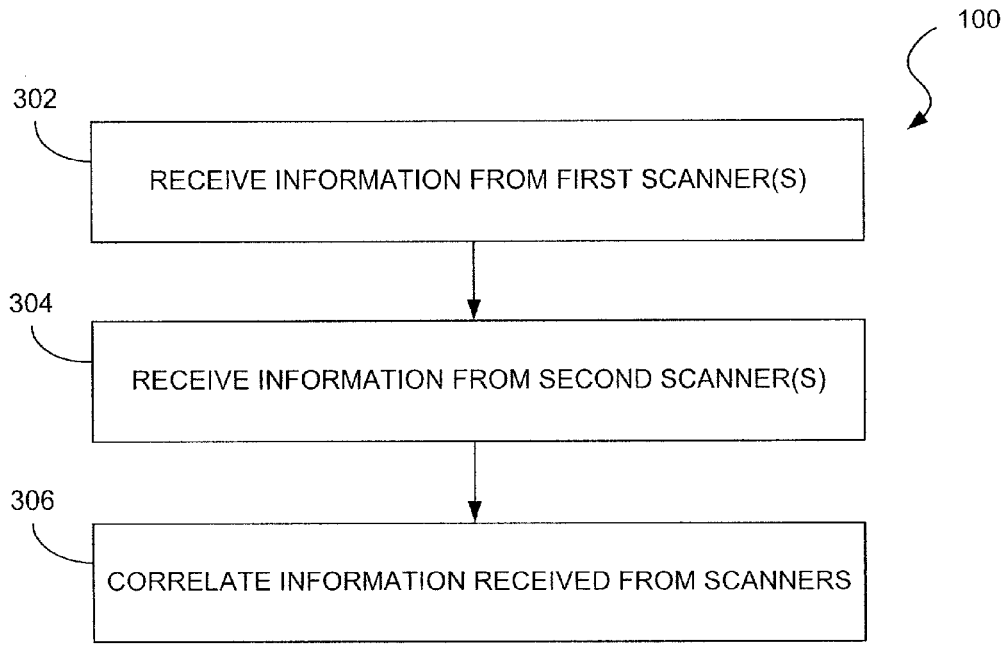
FIG. 3 is a flow chart depicting preferred functionality of the document assembly system depicted in FIG. 1.
Figure 4:
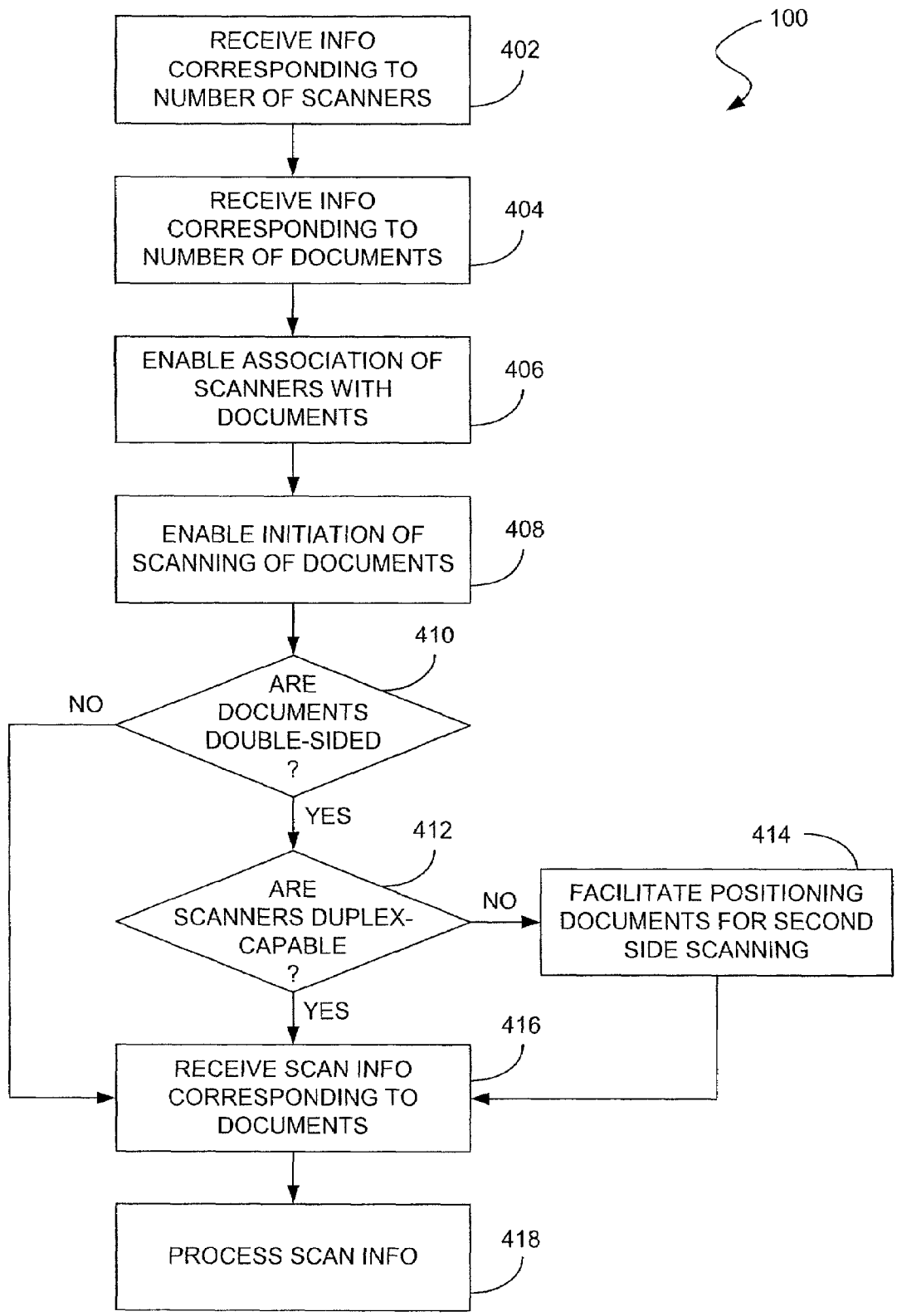
FIG. 4 is a flow chart depicting functionality of an embodiment of the document assembly system of FIG. 1.

The flowcharts of FIGS. 3 and 4 show the functionality of implementations of the document assembly system. In this regard, each block of the respective flowcharts represents a module segment or portion of code which comprises one or more executable instructions for implementing the specified logical function or functions. It should also be noted that, in some alternative implementations, the functions noted in the various blocks of any of the accompanying flowcharts may occur out of the order depicted in the figures. For example, two blocks shown in succession in FIG. 3 may, in fact, be executed substantially concurrently where the blocks may sometimes be executed in the reverse order depending upon the functionality involved.

As depicted in FIG. 3, the document assembly system or method 100 may be construed as beginning at block 302 where information from a first scanner(s) or group of scanners is received. In block 304, information from a second scanner(s) or group of scanners is received. Thereafter, as depicted in block 306, information received from the scanners is correlated. More specifically, in some embodiments, the information provided from the various scanners is provided in a format so that the scan information may be easily attributed to the document(s) with which it is associated. For instance, in those embodiments that are able to simultaneously scan information corresponding to more than one document, the document assembly system may correlate the received information as being associated with the proper document. Additionally, in some embodiments, the information may be ordered, e.g., in page number order, and/or, separated, e.g., information associated with one of the documents is provided in an e-file(s), whereas information associated with others of the documents may be provided in a separate e-file(s), for example. As utilized herein the term "e-file" refers to an electronic file format that is configured so as to be conveniently displayable and/or printable via a command from a personal computer, viewing device, etc.

Reference will now be made to the flow chart of FIG. 4, which depicts functionality of an alternative embodiment of the document assembly system or method 100. As shown in FIG. 4, the process may be construed as beginning at block 402 where information corresponding to a number of scanners is received. More specifically, the information corresponding to the number of scanners may refer to the number of scanners available for use by the document processing system 10 (FIG. 1). In block 404, information corresponding to the number of documents to be scanned is received.

After receiving information corresponding to the number of scanners and the number of documents to be processed, the process may proceed to block 406 where association of the scanners with the documents to be scanned is enabled. By way of example, the document assembly system may associate each scanner with one or more documents or portion of a document to be scanned. In some embodiments, scanners may be designated as being associated with a group of scanners for processing. In these embodiments, a particular group of scanners may be designated for processing a particular document(s).

In block 408, initiation of scanning of the documents is enabled. Proceeding to block 410, a determination may be made as to whether any of the documents are doubled-sided, e.g., whether any of the documents include printed information to be scanned on two sides of one or more of the pages. If it is determined that at least some of the documents are doubled-side, the process may proceed to block 412 where a second determination is made. In particular, a determination may be made as to whether any of the scanners are duplex capable, i.e., capable of automatically scanning both sides of a page. If it is determined that one or more of the scanners are duplex capable (and that a duplex capable scanner is associated with the double-sided documents), the process may proceed to block 416 where scan information corresponding to the documents may be received once the documents have been scanned. It should be noted that, in some embodiments, the determination of whether double-sided documents are to be scanned and whether the scanners are duplex capable may be facilitated prior to associating particular scanners with particular documents to be scanned. In these embodiments, any such double-sided documents may be associated with scanners that are duplex capable, thereby further increasing the potential efficiency of the scanning operation.

Returning to block 410, if it is determined that double-sided documents are to be scanned and, in block 412, it is determined that scanners are not duplex capable, the process may proceed to block 414 where positioning of the documents for second side scanning is facilitated. For example, the scanning process may be momentarily delayed until a user is able to manually flip the documents so that the second side of the documents may be properly processed. Thereafter, the process may proceed to block 416 where scan information corresponding to the documents is received. Additionally, if it is determined that no double-sided documents are to be scanned, the process may proceed from block 410 to block 416.

After scan information corresponding to the scanned documents has been received, scan information may be processed. As depicted in block 418, processing of the scan information may include providing OCR processing and/or correlating the scan information received from the various scanners so that the information may be attributable to the proper document.

By way of example, embodiments of the document assembly system may allocate a particular portion of a memory device to receive scan information associated with a particular document. For instance, when multiple documents are to be scanned, the memory may be partitioned into multiple portions, with each portion being associated with a particular document. Similarly, when a portion of each document is to be associated with a particular scanner, the memory may be further partitioned into portions associated with each scanner. The allocation of memory as being associated with particular documents or portions thereof may, in some embodiments, be attributed to the functionality depicted in blocks 402–406 of FIG. 4, for example. Each scanner may then be designated, such as by being assigned a marker, for example, as being associated with one or more of the partitioned portions of memory. So provided, when each scanner sends scan information to the document assembly system, the scan information may be readily identified as being associated with a particular one of the scanners. Once the scan information has been identified, the scan information may be provided to the appropriate portion of memory, thereby enabling the document assembly system to store scan information in a logical order. More specifically, pages of the documents to be scanned may be allocated to the scanners such that the document assembly system may readily identify a particular grouping of pages as being assigned to a particular scanner. Thus, when scan information is identified as being received from that scanner, the page numbers corresponding to the scan information also is known. The scan information then may be placed in an appropriately designated portion of memory.

Once the scanners have completed the scanning process, a signal(s) denoting completion of scanning may be provided from the scanners to the document assembly system. In response to receipt of such a signal, scan information associated with each document may be "glued" back together such that, in some embodiments, a single e-file may be provided for each document scanned.

Some embodiments of the document assembly system may facilitate checking of one or more parameters of a scanning process. By way of example, some embodiments may be configured so as to enable comparing the total number of pages to be scanned to the number of pages associated with scanned information received by the document assembly system, among others.

Figure 5:
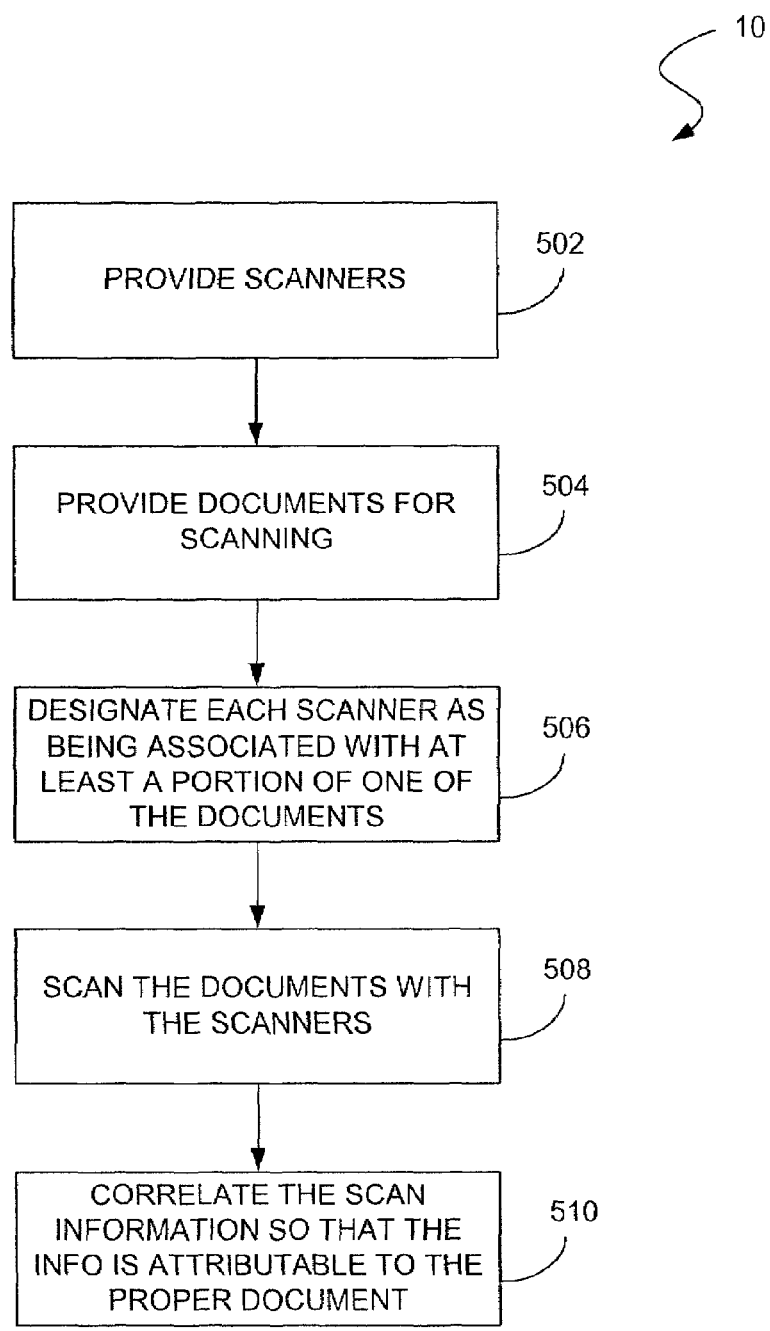
FIG. 5 is a flow chart depicting functionality of an embodiment of the document processing system of FIG. 1.

Reference will now be made to FIG. 5, which depicts functionality of a preferred embodiment of the document processing system or method 10 depicted in FIG. 1. As shown in FIG. 5, the process may be construed as beginning at block 502 where scanners are provided. In block 504, a document(s) is provided for scanning. Thereafter, such as in block 506, each scanner is designated as being associated with at least a portion of the document(s) to be scanned. Proceeding to block 508, the documents are scanned by the scanners and, in block 510, scan information is correlated so that the information is attributable to the proper document. So provided, the document processing system of the present invention may facilitate simultaneous, or nearly simultaneous, scanning and/or processing of a document(s) by multiple scanners. By utilizing the document assembly system, information generated by the scanners may be appropriately correlated so that the scan information corresponding to the scanned documents may be properly sorted and/or stored.

By utilizing the document processing system and the associated document assembly system of the present invention an increase in scanning efficiency may be achieved. In this regard, utilization of the present invention may substantially negate the necessity of sequentially scan both sides of a particular page to be scanned before beginning scanning of a following page. Additionally, book e-file integration may be automatically provided, in some embodiments. The present invention also may increase efficiency of a scanning operation by potentially reducing equipment cost as relatively less expensive, lower-speed scanners may be utilized by the document processing system. In particular, by utilizing multiple scanners, an increase in processing efficiency may be achieved as the scan information provided from these various scanners is correlated via the document assembly system.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

The invention claimed is:

1. A method for providing information corresponding to a document comprising the steps of:
   receiving scan information from a first scanner;
   receiving scan information from a second scanner;
   correlating the scan information received from the first scanner with the scan information received from the second scanner;
   determining whether scan information corresponding to all of multiple pages to be scanned has been received; and
   if scan information corresponding to all of the pages to be scanned has not been received, enabling notification of receipt of scan information corresponding to less than all of the pages to be scanned.

2. The method of claim 1, further comprising the steps of:
   receiving information corresponding to a number of scanners available for scanning;
   receiving information corresponding to the pages to be scanned;
   enabling association of the scanners available for scanning with the pages to be scanned; and
   enabling scanning of the pages to be scanned with the scanners available for scanning.

3. The method of claim 1, wherein the scan information from the first scanner corresponds to pages in a first document and the scan information from the second scanner corresponds to pages in a second document, and wherein the step of correlating the scan information comprises correlating the scan information such that the scan information from the first scanner is attributable to the first document and the scan information from the second scanner is attributable to the second document.

4. The method of claim 1, wherein the scan information from the first scanner corresponds to first pages of a document and the scan information from the second scanner corresponds to second pages of the document, and wherein the step of correlating the scan information comprises correlating the scan information such that the scan information from the first scanner is attributable to the first pages of the document and the scan information from the second scanner is attributable to the second pages of the document.

5. The method of claim 1, wherein the step of correlating the scan information comprises:
   allocating scan information from the first scanner to a first portion of memory such that scan information received from the first scanner is stored by the first portion of memory; and
   allocating scan information from the second scanner to a second portion of memory such that scan information received from the second scanner is stored by the second portion of memory.

6. The method of claim 1, wherein the step of correlating the scan information comprises:
   providing the scan information from the first scanner to a first e-file; and
   providing the scan information from the second scanner to a second e-file.

7. A method for providing information corresponding to a document comprising the steps of:
   receiving first scan information from a first scanner, the first scan information corresponding to a first document;
   providing the first scan information to a first e-file;
   attributing the first scan information to the first document;
   receiving second scan information from a second scanner, the second scan information corresponding to a second document;
   providing the second scan information to a first e-file; and
   attributing the second scan information to the second document.

8. A method for providing information corresponding to a document comprising the steps of:
   receiving first scan information from a first scanner, the first scan information corresponding to a first portion of a document;
   attributing the first scan information to the first portion of the document;
   receiving second scan information from a second scanner, the second scan information corresponding to a second portion of the document;
   attributing the second scan information to the second portion of the document; and
   providing the first scan information and the second scan information to a specified e-file corresponding to the document.

9. A computer readable medium having a computer program stored thereon for providing information corresponding to a document, said computer program comprising:
   logic configured to receive scan information from a first scanner;
   logic configured to receive scan information from a second scanner;
   logic configured to correlate the scan information received from the first scanner with the scan information received from the second scanner;
   logic configured to determine whether scan information corresponding to all of multiple pages to be scanned has been received; and
   logic configured to, if scan information corresponding to all of the pages to be scanned has not been received, enable notification of receipt of scan information corresponding to less than all of the pages to be scanned.

10. The computer readable medium of claim 9, further comprising:
    logic configured to receive information corresponding to a number of scanners available for scanning;
    logic configured to receive information corresponding to the pages to be scanned;
    logic configured to enable association of the scanners available for scanning with the pages to be scanned; and
    logic configured to enable scanning of the pages to be scanned with the scanners available for scanning.

11. The computer readable medium of claim 9, wherein the scan information from the first scanner corresponds to pages in a first document and the scan information from the second scanner corresponds to pages in a second document, and wherein the logic configured to correlate the scan information comprises logic configured to correlate the scan information such that the scan information from the first scanner is attributable to the first document and the scan information from the second scanner is attributable to the second document.

12. The computer readable medium of claim 9, wherein the scan information from the first scanner corresponds to first pages of a document and the scan information from the second scanner corresponds to second pages of the document and wherein the logic configured to correlate the scan information comprises logic configured to correlate the scan information such that the scan information from the first scanner is attributable to the first pages of the document and the scan information from the second scanner is attributable to the second pages of the document.

13. The computer readable medium of claim 9, wherein the logic configured to correlate the scan information comprises:
   logic configured to allocate scan information from the first scanner to a first portion of memory such that scan information received from the first scanner is stored by the first portion of memory; and
   logic configured to allocate scan information from the second scanner to a second portion of memory such that scan information received from the second scanner is stored by the second portion of memory.

14. The computer readable medium of claim 9, wherein the logic configured to correlate the scan information comprises:
   logic configured to provide the scan information from the first scanner to a first e-file; and
   logic configured to provide the scan information from the second scanner to a second e-file.

15. A computer readable medium having a computer program stored thereon for providing information corresponding to a document, said computer program comprising:
   logic configured to receive first scan information from a first scanner, the first scan information corresponding to a first document;
   logic configured to provide the first scan information to a first e-file;
   logic configured to attribute the first scan information to the first document;
   logic configured to receive second scan information from a second scanner, the second scan information corresponding to a second document;
   logic configured to provide the second scan information to a first e-file; and
   logic configured to attribute the second scan information to the second document.

16. A computer readable medium having a computer program stored thereon for providing information corresponding to a document, said computer program comprising:
   logic configured to receive first scan information from a first scanner, the first scan information corresponding to a first portion of a document;
   logic configured to attribute the first scan information to the first portion of the document;
   logic configured to receive second scan information from a second scanner, the second scan information corresponding to a second portion of the document;
   logic configured to attribute the second scan information to the second portion of the document; and
   logic configured to provide the first scan information and the second scan information to a specified e-file corresponding to the document.

17. A method for providing information corresponding to a document comprising the steps of:
   associating first pages to be scanned with a first scanner and second pages to be scanned with a second scanner;
   initiating scanning the first pages by the first scanner and the second pages by the second scanner;
   determining if any of the first or second pages require scanning both sides of the page;
   if it is determined that some of the first pages or some of the second pages require scanning both sides of the page, then determining if the scanner associated with the page is capable of scanning both sides of the page;
   if it is determined that the scanner associated with any pages requiring scanning both sides of the page is capable of scanning both sides of the page, then receiving first scan information corresponding to the first pages from the first scanner and second scan information corresponding to the second pages from the second scanner; and then
   correlating the first scan information with the second scan information.

18. The method of claim 17, wherein:
   associating first pages to be scanned with a first scanner comprises associating first pages of a document with the first scanner; and
   associating second pages to be scanned with a second scanner comprises associating second pages of the document with the second scanner.

19. A computer readable medium having a computer program stored thereon for providing information corresponding to a document, said computer program comprising:
   logic configured to associate first pages to be scanned with a first scanner and second pages to be scanned with a second scanner;
   logic configured to initiate scanning the first pages by the first scanner and the second pages by the second scanner;
   logic configured to determine if any of the first or second pages require scanning both sides of the page;
   logic configured to, if it is determined that some of the first pages or some of the second pages require scanning both sides of the page, then determine if the scanner associated with the page is capable of scanning both sides of the page;
   logic configured to, if it is determined that the scanner associated with any pages requiring scanning both sides of the page is capable of scanning both sides of the page, then receive first scan information corresponding to the first pages from the first scanner and second scan information corresponding to the second pages from the second scanner; and
   logic configured to correlate the first scan information with the second scan information.

20. The computer readable medium of claim 19, wherein:
   logic configured to associate first pages to be scanned with a first scanner comprises logic configured to associate first pages of a document with the first scanner; and
   logic configured to associate second pages to be scanned with a second scanner comprises logic configured to associate second pages of the document with the second scanner.

* * * * *